Dec. 8, 1953           J. HOLMES           2,662,155
ELECTRONIC RELAY CONTROL
Filed April 20, 1951
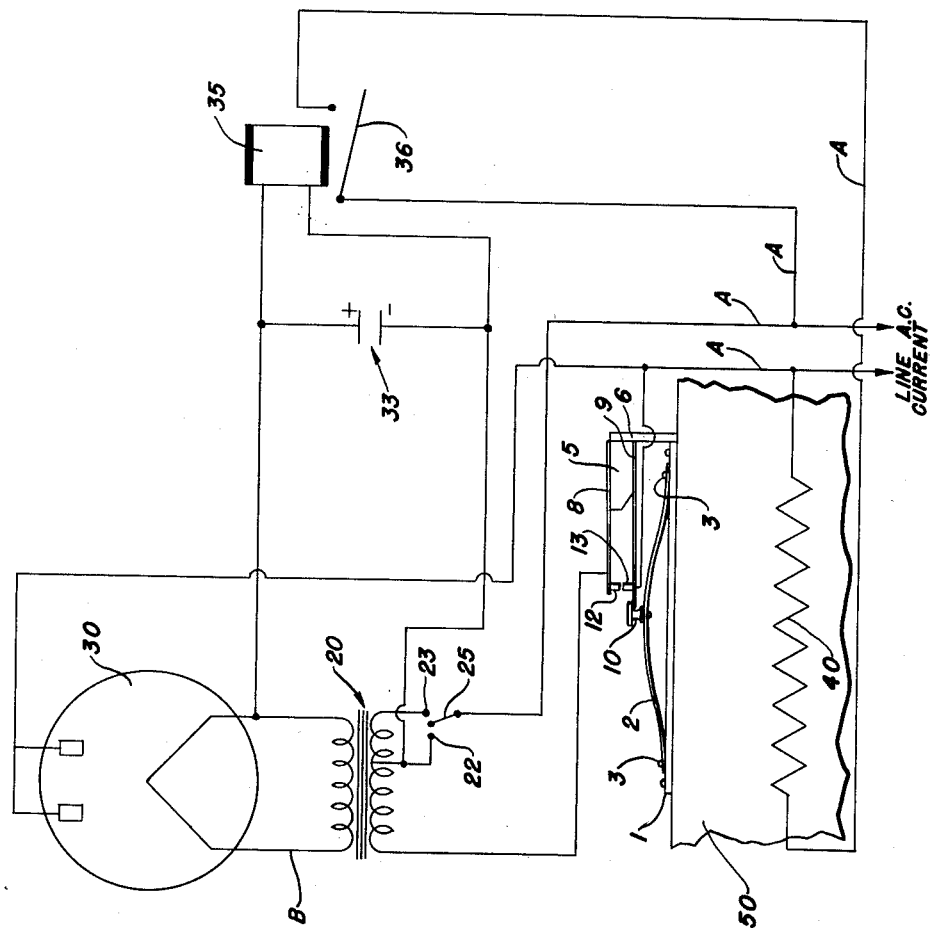
INVENTOR.
JACK HOLMES
BY
ATTORNEY Patented Dec. 8, 1953

2,662,155

UNITED STATES PATENT OFFICE 2,662,155

ELECTRONIC RELAY CONTROL

Jack Holmes, Cleveland, Ohio, assignor to James C. Heintz & Company, Inc., Cleveland, Ohio, a corporation of Ohio Application April 20, 1951, Serial No. 222,000

2 Claims. (Cl. 219—20)

This invention relates to a control circuit for an alternating-current circuit for a heater or any other high-current load which is operated from a slow-moving, close-differential control. The invention will be described more particularly as used with a thermostat.

The thermostat is of the slow-moving (or expansion), close-differential type as contrasted with the snap-action type. Illustrative of this slow-moving or expansion type of thermostat is one formed of a base of any metal having a high coefficient of thermal expansion to which are fastened the two ends of a flexible strip of a metal having a low coefficient of thermal expansion, the center of this flexible strip being bowed away from the base. As the thermostat is heated and cooled its bowed center moves toward and away from the base. As it is heated it moves toward the base and opens the control circuit, and as it cools off it moves away from the base and closes the control circuit. Other types of slow-moving, close-differential thermostats are direct-acting bellows types and bi-metal types.

These slow-acting, close-differential thermostats have been used satisfactorily in series with a heating coil or other high resistance element which carries only low wattages. They are preferred to the snap-action type thermostats for close temperature adjustments because they can be adjusted to operate with a very small difference between the "on" and the "off" positions of the switch contacts, which may be as little as one degree Fahrenheit.

The snap-action type thermostats generally include a toggle which when off-center is snapped by a spring. These thermostats do not permit the close differential between "on" and "off" obtainable with a slow-moving type. In general, the snap-action type cannot be used to control temperatures to a differential of less than one degree Fahrenheit.

In circuits for heaters or the like carrying high wattages, the amount of current to be handled suggests the desirability of using a slow-moving, close-differential thermostat to actuate a relay in the heater circuit. However, attempts to do this caused unnecessary burning of the relay contacts resulting from the inherent chattering of the slow-moving contacts of the precision type thermostat. This inherent characteristic of slow-moving contacts of the type described is evidenced by a sharp chattering noise at the relay. Chattering at the thermostat contacts can be tolerated because the power in the thermostat circuit is relatively low, a matter of a few watts, but a reflection of such chattering in the contacts of the relay in the load circuit would result in a power arc.

According to this invention a rectifier tube in conjunction with a transformer is used between a slow-moving, close-differential thermostat and the relay. A condenser is placed across the relay to make the direct current from the rectifier tube more uniform. This circuit operates without any chattering of the direct current relay because the output of the diode rectifier is a function of the heating of the filament in accordance with the square of the current. Therefore, current interruptions due to chattering of the thermostat contacts are damped out or suppressed in the direct current relay coil which controls the power circuit. In spite of chattering in the thermostat contacts, the holding power of the relay will decrease uni-directionally when the contacts of the thermostat are opened. The operation of the thermostat in this circuit is steady and reliable. The temperature of the heater can be controlled within a variation of not more than about one degree Fahrenheit.

The invention will be further described in connection with the accompanying drawing which shows an alternating-current power circuit and a more or less diagrammatic illustration of a slow-moving, close-differential thermostat.

The slow-moving, close-differential thermostat of the drawing is formed of the base 1 which may be of cast iron and the flexible metal strip 2 which has a lower coefficient of thermal expansion than the base. The base may be formed as a channel, to prevent warping. The strip 2 may be Invar. The screws 3 hold the ends of the strip to the base. As the thermostat is heated the Invar strip tends to straighten out, and as it cools the central portion of the strip moves further from the base. The fiber insulating block 5 is fastened to the end piece 6. The spring metal conductors 8 and 9 are fastened to the top and bottom of the insulating block. The end of the conductor 9 projects under the knob of the porcelain fitting 10 and when the thermostat heats up the fitting pulls the conductor 9 away from the conductor 8 and separates the contact points 12 and 13. These contact points are preferably no more than several thousandths of an inch apart, when wide open. When the thermostat cools off, the Invar strip becomes more bowed and the fitting is lifted, allowing the conductor 9 to resume its normal position so that the contacts 12 and 13 are brought together and the current again flows through the circuit. Means for adjusting the temperature at which the thermostat operates have not been shown. Such means will vary the angle which the strips 8 and 9 make with the base, and this is best done by turning the block 5 by an adjusting screw or the like.

Most commercial alternating-current circuits operate at 110 or 220 volts. The transformer 20 may be of any suitable design. It may be designed to operate solely at about 110 volts or solely at about 220 volts, but is preferably provided with two terminals 22 and 23 so that if used in a circuit operating at 110 volts the switch 25 will contact terminal 22, and in a 220-volt circuit it will contact terminal 23. The voltage will be reduced by the transformer to any low voltage such as 2 or 3 volts up to 25 or 35 volts, for example, depending upon the type of rectifier tube employed. In the circuit illustrated the secondary of the transformer operates at 5 volts.

The rectifier tube 30 is of any suitable design. A plate-filament type of tube has proven more satisfactory than the heater-cathode plate type or the gaseous type. In the circuit illustrated in the drawing, a 5Y3GT tube is used. This is a standard tube in which 5 means 5-volt filament; Y means rectifier type of tube; 3 means 3 separate electrodes (2 plates and 1 filament); G means glass; and T designates a certain size of tube. This particular tube gives forth a pulsating direct current. The condenser 33 modifies this to produce a substantially straight-line current. A 20-microfarad condenser has proved satisfactory although condensers of other values may be used. The tube delays the action of the thermostat because current flows only when the filament is hot. Once the filament is hot, the current continues to flow until the thermostat breaks clean or completely interrupts the flow of current. At the start of the break the thermostat contacts may chatter, due to vibration or inertia of breaking contact. However, the current will continue to flow during such chattering and the filament heat will be maintained. When the break is clean, the filament will cool, deenergizing the relay. With this arrangement, there is no possibility of chattering at the relay.

The relay 35 is operated by the flow of current through the tube 30, and operates switch 36 which opens and closes the circuit which includes the heating elements or other controlled circuit 40.

The thermostat is mounted with its base flat against the metal object 50 or other object the temperature of which is to be controlled. The line current (about 110 or 220 volts alternating current) flows through wires A. When the tube is heated, the current flowing through the thermostat is approximately 0.1 ampere at 110 volts or 0.05 ampere at 220 volts. The thermostat load is therefore approximately 10 watts. That eliminates substantially all wear on the contact points of the thermostat. The secondary B of the filament and isolating transformer is operating at 5 volts and 2 amperes.

It is to be understood that only a preferred embodiment of the invention is illustrated in the drawing. Other thermostats may be used, and it is not necessary that the circuit be used for heat control as it may be used with other types of slow-moving, close-differential controls, such as flow-meters, pressure controls, etc.

What I claim is:

1. A power control circuit for an alternating current line for the control of the flow of current to a power load including a direct current actuated relay between said line and said power load, consisting of a relay control circuit including a thermostat and switch contacts associated therewith so constructed and arranged to make and break a circuit in response to a thermal condition of said power load, a transformer connected to said alternating current line and having the energization of the primary thereof controlled by said switch contacts, a vacuum diode rectifier tube, the filament of which is connected to the secondary of said transformer, the direct current output of said rectifier beng connected to the coil of said relay in said power control circuit, a condenser connected across the output of said rectifier connected to the coil of said relay, whereby any fluctuation of current resulting from chattering of said switch contacts as the circuit controlled thereby is opened, is suppressed in the direct current circuit of said relay control and the holding power of the relay diminished unidirectionally.

2. A power control circuit for an alternating current line for the control of the flow of current to a power load including a direct current actuated relay between said line and said power load, consisting of a relay control circuit including a means responsive to a condition of said load and switch contacts associated therewith so constructed and arranged to make and break a circuit in response to said condition of said power load, a transformer connected to said alternating current line and having the energization of the primary thereof controlled by said switch contacts, a vacuum diode rectifier tube, the filament of which is connected to the secondary of said transformer, the direct current output of said rectifier being connected to the coil of said relay in said power control circuit, a condenser connected across the output of said rectifier connected to the coil of said relay, whereby any fluctuation of current resulting from chattering of said switch contacts as the circuit controlled thereby is opened, is suppressed in the direct current circuit of said relay control and the holding power of the relay diminished unidirectionally.

JACK HOLMES.

References Cited in the file of this patent

UNITED STATES PATENTS

| Number | Name | Date |
|---|---|---|
| 1,219,515 | Whittlesey | Mar. 20, 1917 |
| 1,395,065 | Tuttle | Oct. 25, 1921 |
| 1,751,374 | Waltemath | Mar. 18, 1930 |
| 1,973,123 | Stogoff | Sept. 11, 1934 |
| 2,057,535 | Palmer | Oct. 13, 1936 |
| 2,073,701 | Lazzarini | Mar. 16, 1937 |
| 2,090,531 | Hardin | Aug. 17, 1937 |
| 2,143,501 | Snyder | Jan. 10, 1939 |
| 2,256,117 | Keeley | Sept. 16, 1941 |
| 2,510,041 | Rudahl | May 30, 1950 |